United States Patent
Lee-Tuffnell et al.

(10) Patent No.: US 7,087,651 B2
(45) Date of Patent: Aug. 8, 2006

(54) PROCESS AND APPARATUS FOR STEAM-METHANE REFORMING

(75) Inventors: Clive Derek Lee-Tuffnell, Poole (GB); Ian Frederick Zimmerman, Wimborne (GB); Michael Joseph Bowe, Preston (GB); Jason Andrew Maude, Cheadle (GB)

(73) Assignee: GTL Microsystems AG, Baar (CH)

( * ) Notice: Subject to any disclaimer, the term of this patent is extended or adjusted under 35 U.S.C. 154(b) by 0 days.

(21) Appl. No.: 10/497,235

(22) PCT Filed: Dec. 2, 2002

(86) PCT No.: PCT/GB02/05443

§ 371 (c)(1),
(2), (4) Date: Jun. 1, 2004

(87) PCT Pub. No.: WO03/048035

PCT Pub. Date: Jun. 12, 2003

(65) Prior Publication Data

US 2005/0054737 A1    Mar. 10, 2005

(30) Foreign Application Priority Data

Dec. 5, 2001    (GB)    .................... 0129054.3

(51) Int. Cl.
*C07C 27/00* (2006.01)
(52) U.S. Cl. ............. 518/700; 518/702; 518/704; 518/705
(58) Field of Classification Search ........ 518/700, 518/702, 704, 705
See application file for complete search history.

(56) References Cited

U.S. PATENT DOCUMENTS

| | | | |
|---|---|---|---|
| 1,662,870 A | 3/1928 | Stancliffe | |
| 4,214,867 A | 7/1980 | Hunter | 432/29 |
| 5,534,328 A | 7/1996 | Ashmead | 428/166 |
| 5,786,393 A | 7/1998 | Chaumette | 518/700 |
| 5,811,062 A | 9/1998 | Wegeng | 422/129 |
| 6,200,536 B1 | 3/2001 | Tonkovich | 422/177 |
| 6,284,217 B1 | 9/2001 | Wang | 423/651 |
| 6,440,895 B1 | 8/2002 | Tonkovich | 502/439 |
| 6,451,864 B1 | 9/2002 | Wang | 518/715 |
| 6,488,838 B1 | 12/2002 | Tonkovich | 208/108 |
| 6,495,610 B1 * | 12/2002 | Brown | 518/706 |
| 6,680,044 B1 * | 1/2004 | Tonkovich et al. | 423/652 |

FOREIGN PATENT DOCUMENTS

DE    3926466    2/1991

(Continued)

*Primary Examiner*—J. Parsa
(74) *Attorney, Agent, or Firm*—William H. Holt (57) ABSTRACT

Methane is reacted with steam, to generate carbon monoxide and hydrogen in a first catalytic reactor; the resulting gas mixture can then be used to perform Fischer-Tropsch synthesis in a second catalytic reactor. In performing the steam/methane reforming, the gas mixture is passed through a narrow flow channel containing a catalyst structure on a metal substrate, and adjacent to a source of heat, in a time less than 0.5 s, so that only those reactions that have comparatively rapid kinetics will occur. Both the average temperature and the exit temperature of the channel are in the range 750° to 900° C. The ratio of steam to methane should preferably be 1.4 to 1.6, for example about 1.5. Almost all the methane will undergo the reforming reaction, almost entirely forming carbon monoxide. After performing Fischer-Tropsch synthesis, the remaining hydrogen is preferably used to provide heat for the reforming reaction.

7 Claims, 2 Drawing Sheets

FOREIGN PATENT DOCUMENTS

| | | |
|---|---|---|
| EP | 0212878 | 3/1987 |
| EP | 0292245 | 11/1988 |
| EP | 0416710 | 3/1991 |
| EP | 0430184 | 6/1991 |
| EP | 0466984 | 1/1992 |
| WO | 98/38147 | 9/1998 |
| WO | 01/10773 A1 | 2/2001 |
| WO | 01/12312 | 2/2001 |
| WO | 01/12323 | 2/2001 |
| WO | 01/12753 | 2/2001 |
| WO | 02/064248 | 8/2002 |
| WO | 02/066371 | 8/2002 |

\* cited by examiner

PROCESS AND APPARATUS FOR STEAM-METHANE REFORMING

This invention relates to a chemical process, and to plant including catalytic reactors suitable for use in performing the process.

BACKGROUND OF THE INVENTION

A process is described in WO 01/51194 (Accentus plc) in which methane is reacted with steam, to generate carbon monoxide and hydrogen in a first catalytic reactor; the resulting gas mixture is then used to perform Fisher-Tropsch synthesis in a second catalytic reactor. The overall result is to convert methane to hydrocarbons of higher molecular weight, which are usually liquid under ambient conditions. The two stages of the process, steam/methane reforming and Fisher-Tropsch synthesis, require different catalysts, and catalytic reactors are described for each stage. The catalytic reactors enable heat to be transferred to or from the reacting gases, respectively, as the reactions are respectively endothermic and exothermic; the heat required for steam/methane reforming is provided by combustion of methane. A potential problem with this process is that other reactions may occur in the steam/methane reformer reactor, either to generate carbon dioxide, or to generate coke. It is suggested that the reformer may incorporate a platinum/rhodium catalyst, the reaction being performed at 800° C. The suggested process relies on a steam/methane ratio that is close to 1:1, as the rhodium catalyst is apparently resistant to coking. An improved way of performing this process has now been found.

SUMMARY OF THE INVENTION

According to the present invention there is provided a process for performing steam/methane reforming to generate carbon monoxide and hydrogen, wherein the gas mixture is caused to flow through a narrow flow channel between metal sheets separating the flow channel from a source of heat, the flow channel containing a fluid-permeable catalyst structure with a metal substrate to enhance heat transfer, the residence time in the channel being less than 0.5 second, and both the average temperature along the channel and the exit temperature of the channel being in the range 750° C. to 900° C., such that the selectivity in formation of carbon monoxide is above 85%.

Preferably the residence time is less than 0.1 s, but preferably at least 0.02 s. It is presumed that such short reaction times enable the process to operate under non-equilibrium conditions, so that only those reactions that have comparatively rapid kinetics will occur. It is also preferable that the ratio of steam to methane should be in the range 1.2 to 2.0, more preferably 1.3 to 1.6, more preferably about 1.4 or 1.5. Under these conditions the proportion of methane that undergoes reaction can exceed 90%, and may exceed 95%. Furthermore the selectivity in formation of carbon monoxide rather than carbon dioxide can exceed 90% (selectivity in this context means moles CO/(moles CO+moles $CO_2$)).

The catalytic reactor preferably comprises a plurality of metal sheets arranged to define first and second flow channels, the channels being arranged alternately to ensure good thermal contact between the fluids in them. Appropriate catalysts should be provided in each channel, depending on the required reaction. To ensure the required good thermal contact, both the first and the second flow channels are preferably less than 5 mm deep in the direction normal to the sheets. More preferably both the first and the second flow channels are less than 3 mm deep. Corrugated or dimpled metallic foils, metal meshes or corrugated or pleated metal felt sheets may be used as the substrate of the catalyst structure within the flow channels to enhance heat transfer and catalyst surface area. Since good heat transfer is needed for the steam/methane reforming process to achieve high selectivity in the formation of CO, a preferred such structure comprises a metal foil with a thin coating comprising the catalyst material.

As described in WO 01/51194, such a reactor may be used for performing methane/steam reforming, the alternate channels containing a methane/air mixture so that the exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, or palladium on a metal hexaaluminate such as magnesium, calcium, strontium, barium or potassium hexaaluminate, or preferably palladium and platinum on alumina. For the reforming reaction also several different catalysts may be used, for example nickel, platinum, palladium, ruthenium or rhodium, which may be used on ceramic coatings; the preferred catalyst for the reforming reaction is rhodium or platinum on alumina or stabilised alumina. The catalyst coating is preferably 10–50 μm thick. The oxidation reaction may be carried out at substantially atmospheric pressure, while although the reforming reaction may be carried out at elevated pressure, for example up to 2 MPa (20 atmospheres), operation at atmospheric pressure is preferred, or possibly slightly elevated pressure for example in the range 0 to 200 kPa above atmospheric pressure.

It will be appreciated that the materials of which the reactor are made are subjected to a severely corrosive atmosphere in use, for example the temperature may be as high as 900° C., although more typically around 800° C. or 850° C. The reactor may be made of a metal such as an aluminium-bearing ferritic steel, in particular of the type known as Fecralloy (trade mark) which is iron with up to 20% chromium, 0.5–12% aluminium, and 0.1–3% yttrium. For example it might comprise iron with 15% chromium, 4% aluminium, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the oxide coating, so ensuring the catalytic material adheres to the metal substrate. An alternative structural metal would be Inconel HT800, or another high temperature alloy.

For some purposes the catalyst metal might instead be deposited directly onto the adherent oxide coating of the metal (without any ceramic layer).

The gases produced by the steam/methane reforming process described above are preferably then subjected to Fischer-Tropsch synthesis. This may be performed using a second such reactor, with a different catalyst. Where excess hydrogen remains, after the Fisher-Tropsch synthesis, this hydrogen is preferably separated from the desired products, and fed back to the combustion flow channels of the steam/methane reforming reactor. Combustion of a mixture of methane and hydrogen in the channels has been found to give more uniform temperature, and also enables the combustion reaction to be initiated more readily when the reactor is cold.

BRIEF DESCRIPTION OF THE DRAWINGS

The invention will now be further and more particularly described, by way of example only, and with reference to the accompanying drawings in which.

DETAILED DESCRIPTION OF THE INVENTION

The invention relates to a chemical process for converting methane to longer chain hydrocarbons. The first stage involves steam/methane reforming, that is to say the reaction:

This reaction is endothermic, and may be catalysed by rhodium or a platinum/rhodium mixture in a first gas flow channel. The heat required to cause this reaction may be provided by combustion of methane, that is to say:

which is an exothermic reaction, and may be catalysed by palladium or a platinum/palladium mixture in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming can then be used to perform a Fischer-Tropsch synthesis to generate a longer chain hydrocarbon, that is to say:

which is an exothermic reaction, occurring at an elevated temperature, typically between 200 and 350° C., for example 230° C., and an elevated pressure typically between 2 MPa and 4 MPa, for example 2.5 MPa, in the presence of a catalyst such as iron, cobalt or fused magnetite, with a promoter such as potassium. The exact nature of the organic compounds formed by the reaction depends on the temperature, the pressure, and the catalyst, as well as the ratio of carbon monoxide to hydrogen. A preferred catalyst comprises a coating of γ-alumina of specific surface area 140–230 $m^2/g$ with about 10–40% (by weight compared to the weight of alumina) of cobalt, and with a ruthenium, platinum or gadolinium promoter, the promoter being 0.01% to 10% of the weight of the cobalt, and with a basicity promoter such as $ThO_2$. The heat given out by this synthesis reaction may be used to provide at least part of the heat required by the steam/methane reforming reaction, for example a heat transfer fluid such as helium, pressurised water, or Syltherm (trade mark of Dow Corning) may be used to transfer the heat from a reactor in which the Fischer-Tropsch synthesis is occurring, the heat being used to preheat at least one of the gas streams supplied to the reforming reactor.

Figure 1:
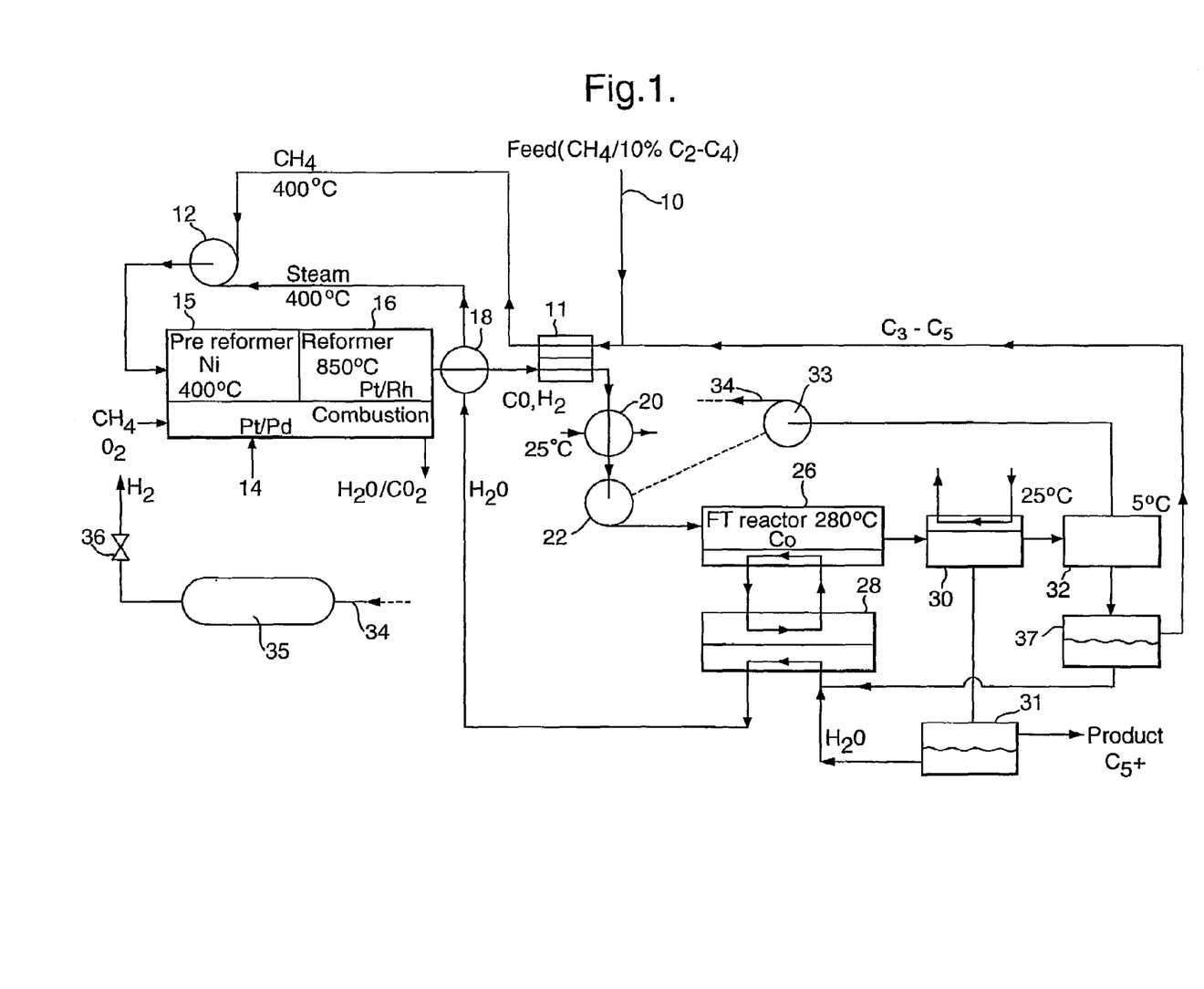
FIG. 1 shows a flow diagram of a chemical process of the invention.

Referring now to FIG. 1, the overall chemical process is shown as a flow diagram. The feed gas 10 consists primarily of methane, with a small percentage (say 10%) of ethane and propane. It is passed through a heat exchanger 11 so it is at about 400° C. and is then supplied via a fluidic vortex mixer 12 to a first catalytic reactor 14; in the mixer 12 the feed gas is mixed with a stream of steam that is also at about 400° C., the streams entering the mixer 12 through tangential inlets and following a spiral path to an axial outlet so they become thoroughly mixed. Both streams may be at atmospheric pressure, or for example at a pressure of say 100 kPa above atmospheric. The flows are preferably such that the steam: methane molar ratio (at the steam/methane reforming stage) is between 1.3 and 1.6, preferably 1.4 to 1.5. The first part of the reactor 14 is a pre-reformer 15 with a nickel or platinum/rhodium methanation catalyst at 400° C., in which the higher alkanes react with the steam to form methane (and carbon monoxide); extra steam is required to ensure the desired steam/methane ratio is achieved after this pre-reforming stage (this pre-reformer 15, which may be a separate reactor, would not be required if the feed gas 10 contained substantially no higher alkanes). The second part of the reactor 14 is a reformer 16 with a platinum/rhodium catalyst, in which the methane and steam react to form carbon monoxide and hydrogen. This reaction may be performed at 850° C.

The heat for the endothermic reactions may be provided by combustion of methane over a palladium or platinum catalyst within adjacent gas flow channels. The catalyst may incorporate γ-alumina as the substrate, coated with a palladium/platinum 3:1 mixture which acts as a catalyst over a wide temperature range, such that the temperature gradually increases from 500° C. to 800 or 900° C. The methane/oxygen mixture may be supplied in stages along the reactor 14, to ensure combustion occurs throughout its length.

The hot mixture of carbon monoxide and hydrogen emerging from the reformer 16 is then quenched by passing through a heat exchanger 18 to provide the hot steam supplied to the vortex mixer 12, and then through the heat exchanger 11 in which it loses heat to the feed gas. The mixture is then further cooled to about 100° C. by passing through a heat exchanger 20 cooled by water. The gases are then compressed through a compressor 22 to a pressure of 2.5 MPa (25 atm.).

The stream of high pressure carbon monoxide and hydrogen is then supplied to a catalytic reactor 26 in which the gases react, undergoing Fischer-Tropsch synthesis to form a paraffin or similar compound. This reaction is exothermic, preferably taking place at about 230° C., and the heat generated may be used to preheat the steam supplied to the heat exchanger 18, using a heat exchange fluid circulated between heat exchange channels in the reactor 26 and a steam generator 28. During this synthesis the volume of the gases decreases. The resulting gases are then passed into a condenser 30 in which they exchange heat with water initially at 25° C. The higher alkanes (say C5 and above) condense as a liquid, as does the water, this mixture of liquids being passed to a gravity separator 31; the separated higher alkanes can then be removed as the desired product, while the water is returned via the heat exchangers 28 and 18 to the mixer 12.

Any lower alkanes or methane, and remaining hydrogen, pass through the condenser 30 and are supplied to a refrigerated condenser 32 in which they are cooled to about 5° C. The gases that remain, consisting primarily of hydrogen with carbon dioxide, methane and ethane, are passed through a pressure-reducing turbine 33 and fed via a duct 34 into a storage vessel 35, and hence through a valve 36 into the combustion channel of the first catalytic reactor 14. The condensed vapours, consisting primarily of propane, butane and water, are passed to a gravity separator 37, from which the water is combined with the recycled water from the separator 31, while the alkanes are recycled to the feed line 10 so as to be fed into the pre-reformer 15. As indicated by the broken line, electricity generated by the turbine 33 may be used to help drive the compressor 22.

When used in this fashion the overall result of the processes is that methane is converted to higher molecular weight hydrocarbons which are typically liquids at ambient temperatures. The processes may be used at an oil or gas well to convert methane gas into a liquid hydrocarbon which is easier to transport.

From the steam/methane reforming reaction given above one would expect that the appropriate mole ratio for steam to methane would be 1:1. However, at that ratio there is a significant risk of coking, and a risk that a significant proportion of the methane will not undergo the reaction. Increasing the proportion of steam increases the proportion of methane that reacts, and decreases the risk of coking, although if the proportion of steam is too high then there is an increased likelihood of carbon dioxide formation. Such excess steam is wasteful of energy and dilutes the reactant gases. It has been found that operating with a steam/methane ratio of between 1.3 and 1.6, preferably 1.4 or 1.5, combined with short residence times that are preferably no more than 100 ms, gives both high selectivity for carbon monoxide formation and also a very high proportion of methane undergoing reaction. The flow rates through the reformer 16 are preferably such that the residence time is in the range 20 to 100 ms, more preferably about 50 ms.

Such a short residence time enables the reactor 16 to operate under what appears to be a non-equilibrium condition. The competing reaction between carbon monoxide and steam to form the unwanted products carbon dioxide and hydrogen has slower kinetics than the steam/methane reforming reaction to form carbon monoxide and hydrogen; and in the reforming reaction the reverse process has slower kinetics than the forward reaction. The short residence time allows insufficient time for the slower reactions to reach equilibrium. Under these circumstances the proportion of methane undergoing reaction may exceed 90%, and the selectivity for carbon monoxide can exceed 90%.

Experimental measurements of this steam/methane reforming stage are shown in the Table. In each case the steam:methane ratio is 1.5, the gas mixture is preheated to 450° or 550° C. and the residence time in the reformer is 50 ms. The reformer has three layers with fifteen channels in all for the steam methane reforming reaction, each channel of breadth 10 mm and length 100 mm, and of depth 1.5 mm, containing a corrugated foil of the same size with a thin alumina coating containing platinum/rhodium catalyst. These channels alternate with four layers of combustion channels to achieve the required heat input.

The temperature was measured at four positions along the length of the centre channel (at 10%, 40%, 60% and 90% of its length), the first and last of these measurements being tabulated as the inlet and exit temperatures, and the mean of all four temperatures is also tabulated.

| Inlet Temp./° C. | Exit Temp./° C. | Mean Temp./° C. | CO Selectivity/% | CH$_4$ Conversion/% |
|---|---|---|---|---|
| 656 | 736 | 712 | 80.1 | 80.7 |
| 717 | 851 | 805 | 88.6 | 91.3 |
| 727 | 869 | 810 | 90.3 | 93.7 |
| 726 | 853 | 810 | 92.5 | 93.8 |
| 731 | 866 | 815 | 93.0 | 94.2 |

It will be observed that where both the mean temperature and the exit temperature are above 750° C., the CO selectivity is above 85%. Better selectivity for CO is obtained where the exit temperature is above say 830° C., preferably above 850° C. The performance of the reactor can also be improved by a pre-treatment, raising the reactor temperature to about 850° C. in the presence of hydrogen, as this can improve subsequent catalyst activity.

As indicated above, the ideal hydrogen to carbon monoxide stoichiometric ratio to feed to the Fischer-Tropsch synthesis reactor would be 2 moles hydrogen to 1 mole carbon monoxide. This ratio cannot readily be obtained by steam/methane reforming: as discussed above, at a steam/methane ratio of 1.0 the resulting gas mixture has a hydrogen to carbon monoxide ratio 3 to 1, and at the elevated steam/methane ratios that must be adopted to avoid coking the hydrogen to carbon monoxide ratio is above 3, and may be as high as 4 to 1. Consequently, after the Fischer-Tropsch synthesis reaction has occurred there will be an excess of hydrogen that remains. Feeding this gas into the combustion channel of the reactor 14 has been found to give a more uniform temperature distribution, and also enables the combustion reaction to be initiated more readily when the reactor is cold (as catalytic combustion can then occur at a temperature as low as 15 or 20° C.). The overall thermal efficiency of the process is improved, the amount of methane fed directly to the combustion channels is decreased, and the emission of carbon dioxide to the environment is also reduced.

Figure 2:
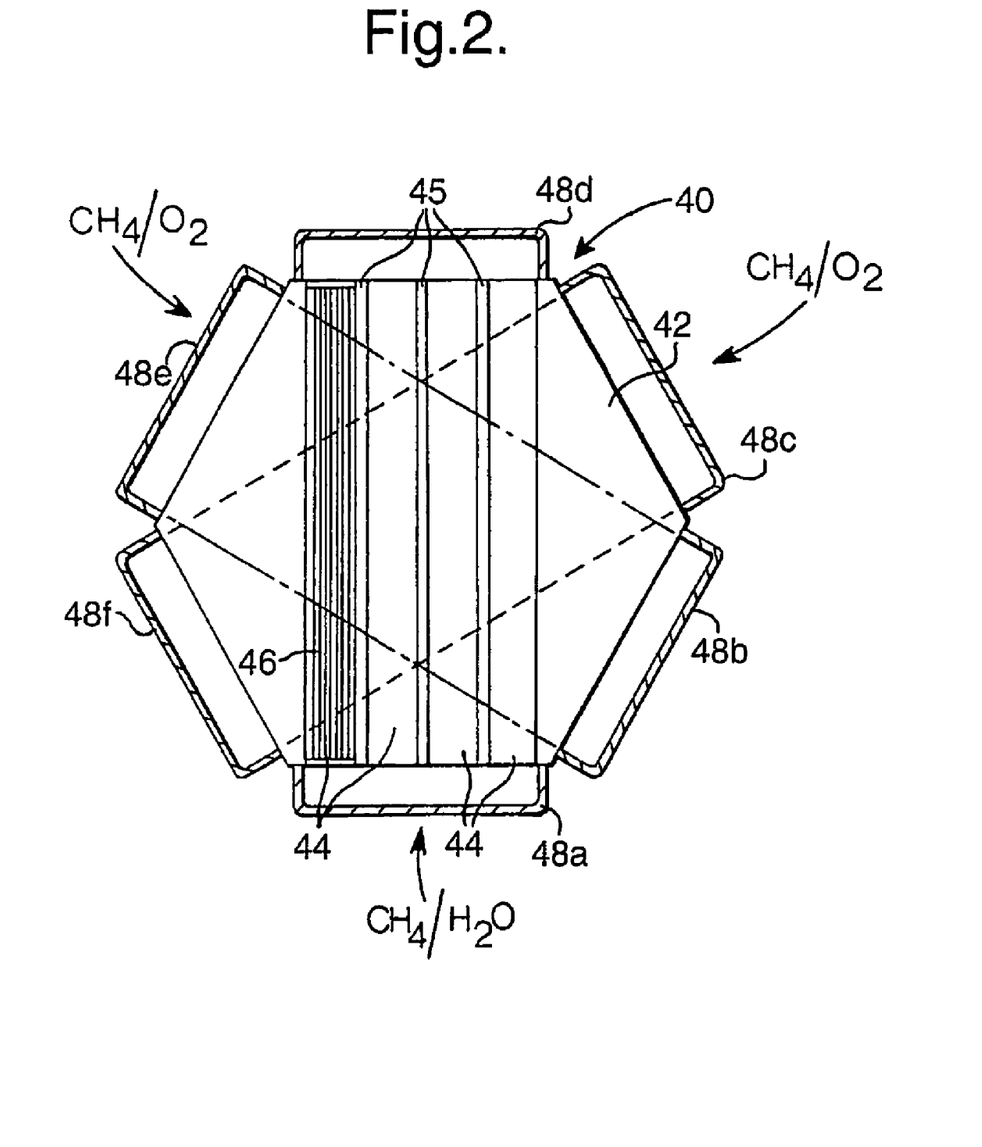
FIG. 2 shows a plan view of a reactor suitable for performing a step of the process shown in FIG. 1.

Referring now to FIG. 2 a reactor 40 (suitable for example for steam/methane reforming) comprises a stack of plates 42 each of Fecralloy steel, each hexagonal, of side 250 mm and 3 mm thick. It should be appreciated that the reactor 40 is given only by way of example, and that other catalytic reactor designs may alternatively be used. Grooves 44 of width 20 mm and depth 2.5 mm are machined in each plate, extending across each plate 42 from one side to the opposite side, separated by lands 45 of width 3 mm (for simplicity only four such grooves 44 and three such lands 45 are shown in the figure). A carrier foil 46 of Fecralloy steel 50 µm thick coated with a ceramic coating of thickness 10–20 µm containing a catalyst material, and with corrugations 2.5 mm high, can be slid into each such groove 44 (only one is shown). A stack of such plates 42 is assembled, the orientation of the grooves 44 differing by 60° in successive plates 42, and is covered with a flat top plate of Fecralloy steel; the stack is then diffusion bonded together. The corrugated foils 46 are then inserted. Headers 48 are then attached to the faces of the assembled stack. Thus the gas flow channels are defined by the grooves 44; and the orientation of the plates 42 is such that the flow directions in the plates 42 above and below any one plate 42 are at 120° to each other (these grooves being indicated by broken lines and chain dotted lines respectively).

The steam/methane mixture is supplied to the header 48a, and the resulting mixture of hydrogen and carbon monoxide emerges through the header 48d. Methane/air mixture is supplied through the headers 48c and 48e (i.e. the headers on either side of the header 48d), so exhaust gas from the combustion process emerges through the headers 48b and 48f. Hence the gas flows are at least partially countercurrent, so that the hottest region in the combustion channels, which is near the inlet to those channels, is closest to the outlet for the steam/methane reforming reaction. Alternatively in some circumstances there may be partially co-current flow.

The headers 48 each comprise a simple rectangular cap sealed around its periphery to the outside of the stack so as to cover one face of the stack. They may be welded onto the outside of the stack. It will be appreciated that after a period of use, if the catalyst in either or both of the channels has become spent, then the headers 48 may be removed or cut off and the corresponding catalyst-carrying foils 46 removed and replaced. The headers 48 can then be re-attached.

It will be understood that the type of ceramic deposited on the corrugated foils 46 in the gas flow channels may be different in successive plates 42 in the stack, and that the catalyst materials may differ also. For example the ceramic might comprise alumina in one of the gas flow channels, and zirconia in the other gas flow channels. The reactor 40 formed from the plates 42 might also be suitable for performing Fischer-Tropsch synthesis. Because the plates 42 forming the stack are bonded together the gas flow channels are gas tight (apart from communication with headers 48 at each end), and the dimensions of the plates 42 and grooves 44 are such that pressures in the alternate gas flow channels may be considerably different. Furthermore the pitch or pattern of the corrugated foils 46 may vary along a reactor channel 44 to adjust catalytic activity, and hence provide for control over the temperatures or reaction rates at different points in the reactor 40. There may be more than one layer of corrugated foil arranged as a stack in a channel 44. The corrugated foils 46 may also be shaped, for example with perforations, to promote mixing of the fluid within the channels 44. Furthermore parts of the foils 46 may be devoid of catalyst.

In a modification to the reactor 40, the foils 46 are again of Fecralloy material, but the catalyst material is deposited directly onto the oxide layer of the Fecralloy. As another alternative the foils 46 might be replaced by a metallic mesh of wires or corrugated or pleated metal fibre sheets, so providing a large surface area for catalyst. It will be appreciated that the reactor 40 may be made of other materials, and for example a reactor 40 for Fischer-Tropsch synthesis may be of titanium or stainless steel.

Particularly where the reactor 40 is to be used for Fischer-Tropsch synthesis, the gas flow channels 44 for that reaction may decrease in width, and possibly also depth, along their length, so as to vary the fluid flow conditions, and the heat or mass transfer coefficients. During the synthesis reaction the gas volume decreases, and by appropriate tapering of the channels 44 the gas velocity may be maintained as the reaction proceeds. Furthermore the pitch or pattern of the corrugated foils 46 may vary along a reactor channel 44 to adjust catalytic activity, and hence provide for control over the temperatures or reaction rates at different points in the reactor 40. The reactor may also be of a different shape, for example made of a stack of rectangular plates with grooves to define flow channels, the grooves in successive plates being at different orientations—for example at angles of 0°, +45°, 0°, −45° etc to the longitudinal axis of the plates, respectively. Headers along the sides of the stack enable gases to flow from one set of channels to the next.

When a reactor such as the reactor 40 is used for reactions between gases that generate gaseous products then the orientation of the channels is not of concern. However if a product may be a liquid, it may be preferable to arrange the reactor 40 so that the flow paths for this reaction slope downwardly, to ensure that any liquid that is formed will drain out of the channels 44. With a rectangular reactor in which the headers provide communication between successive channels, means may be provided in the headers to enhance separation of entrained liquid droplets from the gas flow, or to condense some of the vapours.

It will be appreciated that the overall process described in relation to FIG. 1 may be modified in various ways. For example the short-chain alkanes from the separator 37 might be fed into the combustion channel 14. If a long-chain waxy product is found in the Fischer Tropsch reactor 26 then the condenser 30 might cool the product only to say 60 or 80° C.

It will also be appreciated that although the heat for the steam/methane reforming reaction may be provided by catalytic combustion in adjacent channels (as described above), as an alternative the combustion may take place in an external burner (such as a laminar flow burner), the very hot exhaust gases at about 900 or 1000° C. being passed through the second gas flow channels of the reactor 14 in counter-current to the methane flow; this can enable the reacting gases in the reformer 16 to reach a final temperature of as much as 900° C. In this case it is not essential to provide the foils in the combustion channels with ceramic coating or catalyst, but such foils would nevertheless enhance heat transfer between the second gas flow channel carrying the hot exhaust gas and the reactants in the pre-reformer and reformer channels, by transferring heat to the separating plates 42. In the combustion channels of the catalytic reactor 14, if catalytic combustion is used to generate the heat (as indicated), the combustion catalyst may itself be coated with a thin porous inert ceramic layer, so as to restrict the contact of the gas mixture with the catalyst and so restrict the reaction rate particularly at the start of the channel.

Particularly where hydrogen is unavailable, it may be desirable to provide electrical heating by passing an electric current directly through the plates forming the reactor. This may be used initially to raise the temperature for example of the reforming reactor 14 to say 400° C. before supplying gases, to ensure catalytic combustion occurs. Such electrical heating may also be used during operation to adjust the reactor temperature. Electrical heating may also be used in the vicinity of the outlet from the reactor 14 to ensure that a temperature of say 900° C. is reached by the gases undergoing the reforming reaction.

The invention claimed is:

1. A process for converting methane to longer chain hydrocarbons, the process comprising the steps of:
   (a) mixing a feed gas comprising methane with steam for forming a gas mixture in which the ratio of steam to methane is in the range 1.2 to 2.0;
   (b) subjecting the gas mixture to reforming for generating carbon monoxide and hydrogen in a catalytic reactor comprising several narrow flow channels between metal sheets, the flow channels being arranged alternately with channels for an exothermic reaction to provide a source of heat, so that the sheets separate the flow channels from the source of heat, the flow channel containing a fluid-permeable catalyst structure with a metal substrate to enhance heat transfer, and each flow channel being of length at 100 mm, causing the gas mixture to flow through the flow channels, wherein the residence time in the flow channels is less than 500 ms but at least 20 ms, and both the average temperature along the flow channels and the exit temperature of the flow channels are in the range 750° C. to 900° C.;

(c) subjecting the carbon monoxide and hydrogen from the reforming step to a subsequent Fischer-Tropsch synthesis;

(d) separating a gas stream including hydrogen from the resulting longer chain hydrocarbons; and (e) subjecting the hydrogen-including gas stream to combustion in the channels for the exothermic reaction for providing at least part of the heat source for the reforming step.

2. A process as claimed in claim 1 wherein the reforming reaction step is carried out at atmospheric pressure.

3. A process as claimed in claim 1 wherein the reforming reaction step is carried out at an elevated pressure in the range 0 to 200 kPa above atmospheric pressure.

4. A process as claimed in claim 1 wherein the said ratio is in the range 1.4 to 1.6.

5. A process as claimed in claim 1 including carrying out the Fischer-Tropsch synthesis at a temperature of about 230° C.

6. A process as claimed in claim 1 including the step of compressing the carbon monoxide and hydrogen from the reforming step to a higher pressure before being subjected to the subsequent Fischer-Tropsch synthesis.

7. A process as claimed in claim 1 wherein the residence time of the gas mixture in the reforming reactor is less than 100 ms.

* * * * *

UNITED STATES PATENT AND TRADEMARK OFFICE
CERTIFICATE OF CORRECTION

PATENT NO. : 7,087,651 B2
APPLICATION NO. : 10/497235
DATED : August 8, 2006
INVENTOR(S) : Clive Derek Lee-Tuffnell et al.

It is certified that error appears in the above-identified patent and that said Letters Patent is hereby corrected as shown below:

Column 8, line 67, --least-- is added after "length at" in Claim 1, such that Claim 1 reads as follows:

1. A process for converting methane to longer chain hydrocarbons, the process comprising the steps of:

(a) mixing a feed gas comprising methane with steam for forming a gas mixture in which the ratio of steam to methane is in the range 1.2 to 2.0;

(b) subjecting the gas mixture to reforming for generating carbon monoxide and hydrogen in a catalytic reactor comprising several narrow flow channels between metal sheets, the flow channels being arranged alternately with channels for an exothermic reaction to provide a source of heat, so that the sheets separate the flow channels from the source of heat, the flow channel containing a fluid-permeable catalyst structure with a metal substrate to enhance heat transfer, and each flow channel being of length at <u>least</u> 100 mm, causing the gas mixture to flow through the flow channels, wherein the residence time in the flow channels is less than 500 ms but at least 20 ms, and both the average temperature along the flow channels and the exit temperature of the flow channels are in the range 750°C to 900°C;

(c) subjecting the carbon monoxide and hydrogen from the reforming step to a subsequent Fischer-Tropsch synthesis;

(d) separating a gas stream including hydrogen from the resulting longer chain hydrocarbons; and

UNITED STATES PATENT AND TRADEMARK OFFICE
CERTIFICATE OF CORRECTION

PATENT NO. : 7,087,651 B2
APPLICATION NO. : 10/497235
DATED : August 8, 2006
INVENTOR(S) : Clive Derek Lee-Tuffnell et al.

It is certified that error appears in the above-identified patent and that said Letters Patent is hereby corrected as shown below:

Column 8, line 67, --least-- is added after "length at" in Claim 1, such that Claim 1 reads as follows: (cont'd)

(e) subjecting the hydrogen-including gas stream to combustion in the channels for the exothermic reaction for providing at least part of the heat source for the reforming step.

Signed and Sealed this

Sixth Day of February, 2007

JON W. DUDAS
*Director of the United States Patent and Trademark Office*